United States Patent [19]
Hannula

[11] Patent Number: 6,122,160
[45] Date of Patent: Sep. 19, 2000

[54] ARRANGEMENT FOR CONNECTING ONE OR MORE FUSES TO A DISTRIBUTION UNIT

[75] Inventor: Taru Johanna Hannula, Älta, Sweden

[73] Assignee: Telefonaktiebolaget LM Ericsson, Stockholm, Sweden

[21] Appl. No.: 09/384,436

[22] Filed: Aug. 27, 1999

[51] Int. Cl.[7] ....................................................... H02B 1/04
[52] U.S. Cl. .................... 361/600; 361/634; 361/622; 361/624; 361/644; 361/648; 361/652; 361/627; 361/641; 361/643; 361/637; 200/50.4; 174/59; 174/68.2; 174/708; 248/220.2; 248/223.3
[58] Field of Search ...................... 361/614, 658, 361/725, 828, 832, 837, 600–609, 623–637, 641–647; 174/68.2, 70 B, 59, 708; 200/50.26, 50.27, 306, 293, 50.6; 439/218; 248/220.2, 223.3

[56] References Cited

U.S. PATENT DOCUMENTS

| | | | |
|---|---|---|---|
| 2,869,043 | 1/1959 | Locher | 317/119 |
| 4,744,001 | 5/1988 | Krafft et al. | 361/832 |
| 6,002,580 | 12/1999 | LeVantine | 361/634 |

*Primary Examiner*—Leo P. Picard
*Assistant Examiner*—Michael Datskovsky
*Attorney, Agent, or Firm*—Burns, Doane, Swecker & Mathis, L.L.P.

[57] ABSTRACT

The present invention relates to an arrangement for connecting one or more circuit breakers (7) directly to a distribution unit (10) for supplying power to radio base stations and for charging the batteries of such stations. As a result of mutually separating bottom circuit breaker connectors (8) and upper circuit breaker connectors in a power bar (9) constructed in accordance with the invention, the circuit breakers can be connected directly without requiring the presence of a circuit breaker holder to this end, therewith reducing the amount of space required for establishing such connections with respect to earlier known techniques.

8 Claims, 8 Drawing Sheets

ARRANGEMENT FOR CONNECTING ONE OR MORE FUSES TO A DISTRIBUTION UNIT

FIELD OF INVENTION

The present invention relates to an arrangement for connecting one or more fuses, such as circuit breakers, to a power supply distribution unit included, for instance, in a system for supplying power to radio base stations and for recharging their batteries.

BACKGROUND OF THE INVENTION

It is known to use some type of fuse holder to mount standard circuit breakers in distribution units for supplying electric current to radio base stations and for re-charging the batteries of said stations. This type of fuse holder is often designed to carry and correctly connect a circuit breaker to an input power supply bar, an alarm board, and to establish an output cable connection in a distribution unit. The vertical space required to house this type of connector means with circuit breakers carried by a fuse holder is determined by the vertical extension of three mutually overlying modules.

Figure 1A:
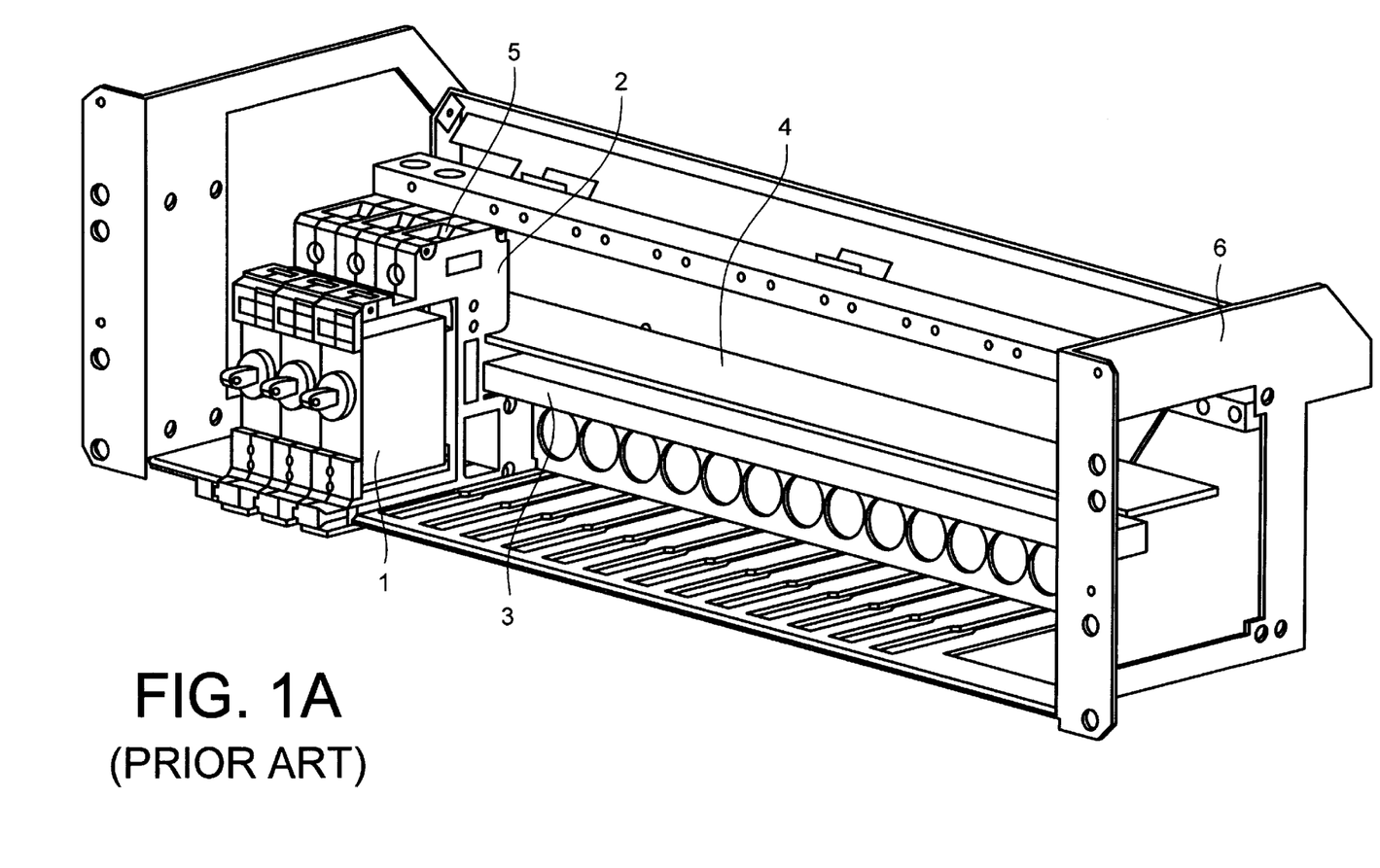
FIG. 1A is an oblique front view of a known circuit breaker connection unit which is shown to include three circuit breakers connected to a fuse holder in a distribution unit for a power supply equipment.

FIG. 1 shows how three standard circuit breakers mounted in a fuse holder are connected to an input power bar, an alarm board, and upper output cable connections.

DISCLOSURE OF THE INVENTION

With the intention of gaining vertical space in a distribution unit designed to supply power to radio base stations and also to charge and re-charge the batteries of such stations each standard circuit breaker has been connected directly to an input power supply bar and to an output cable connection without the use of an intermediary fuse holder, wherewith said vertical space need only accommodate two modules for this type of connection. This has been made possible by the particular design of the output cable connections which have been given a form that is identical with a first connection hole that receives one pole or terminal of the circuit breaker and with a second connection hole at right angles to the first connection hole for receiving one end of an output cable. The diameter of the first connection hole has been adapted to fit the resilient outer casing of the circuit breaker pole pin, so as to ensure reliable contact between pole pin and the hole. The diameter of the second connection hole has been adapted to accommodate cable ends of different diameters and has been provided with means for securing a cable end inserted into said hole, said means having the form of a screw whose one end acts on said cable end against a flat surface. The output cable connection may also include an electrical contact surface for connection of an alarm cable to the output cable connection, so as to enable the function of the circuit breaker and the prevailing current strength or amperage to be readily monitored.

This novel type of circuit breaker connection enables circuit breakers to be fitted in a relatively inexpensive and simple fashion and also provides several facilities. These facilities include small tolerances with resilient pins, good conductivity, connection of alarm signal cables and securement of the circuit breaker connection by means of a single screw, which causes no damage nor contributes to any voltages on a clamping or gripping device and enables large tolerances to be applied in respect of peripheral structural elements while retaining fine tolerances with respect to the connection obtained with the resilient pins.

The invention will now be described in more detail with reference to a preferred embodiment thereof and also with reference to the accompanying drawings.

2

DESCRIPTION OF PREFERRED EMBODIMENTS

Figure 1B:
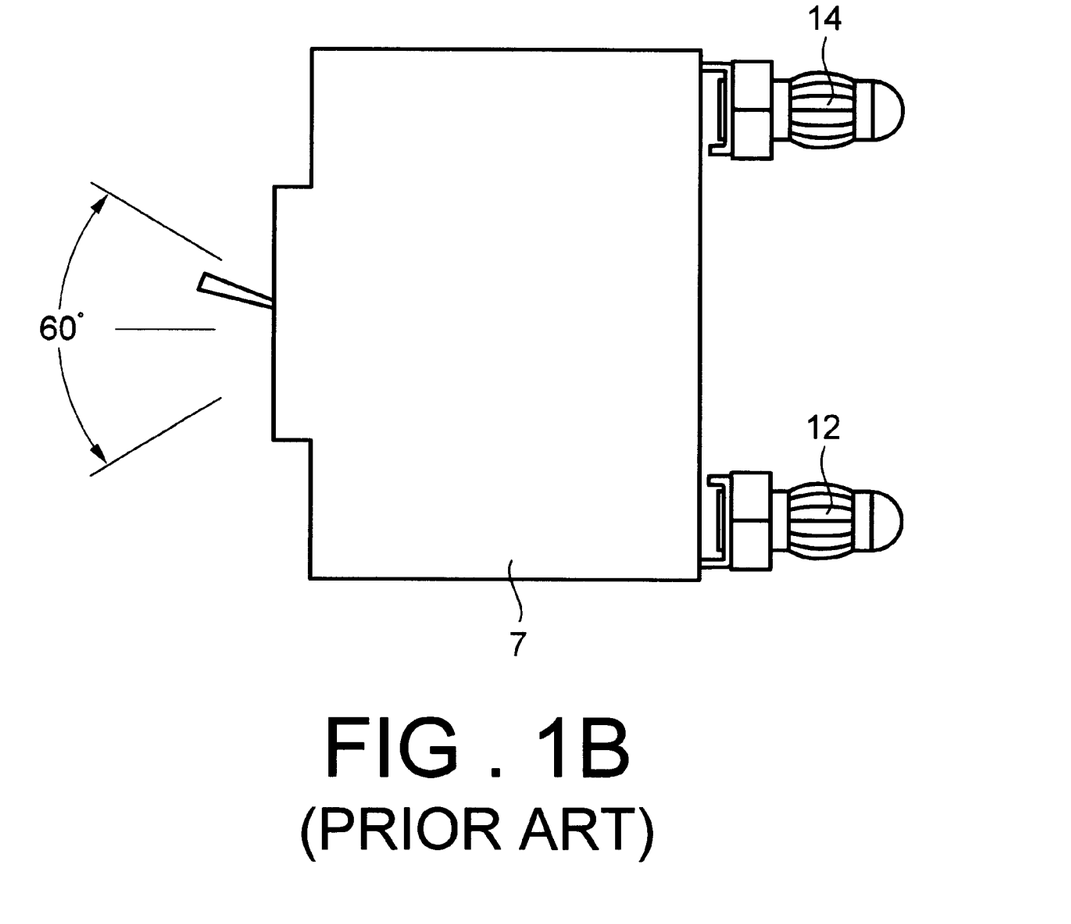
FIG. 1B is a side view of a known circuit breaker.
Figure 2:
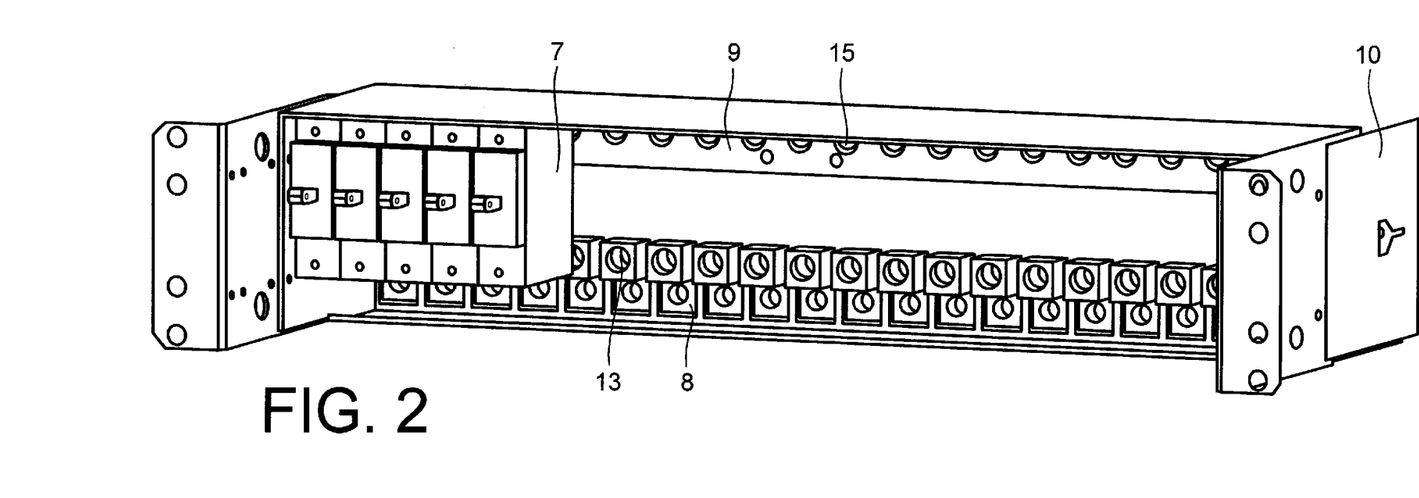
FIG. 2 is an oblique front view of circuit breaker connections constructed in accordance with the invention, with seven circuit breakers connected in a distribution unit for power supply equipment.

Distinct from the known construction shown in FIG. 1A in which three circuit breakers 1 carried by a fuse holder 2 are connected to an input power supply bar 3, an alarm board 4, and upper output cable connections 5 in a distribution unit 6, the inventive construction illustrated in FIG. 2 includes seven standard circuit breakers 7 which are connected directly to bottom circuit breaker connectors 8 and directly to an upper power supply bar 9 in a distribution unit/distribution fuse unit 10 servicing power supply equipment 11. Arranged on the bottom of each circuit breaker 7 on the output side is a resilient pole pin 12 which is inserted into a hole 13 on the bottom circuit breaker connector 8 for resilient contact with the connector. Arranged on the top of each circuit breaker on the input side is an upper resilient pole pin 14 which is in resilient contact with a hole 15 in the upper power supply bar 9, said hole being adapted to the size of the pin. The power supply bar 9 is also connected to an electric circuit. FIG. 1B is a simplified illustration of a circuit breaker 7 provided with respective resilient pole pins 12, 14. The distribution (fuse) unit may be powered with a positive voltage and a negative connection for distribution may be established in a connection unit or in a so-called battery fuse unit, which may also include such facilities as load connection with contactors, current measurement, fuse alarms, negative connections for distribution fuses, and a control board for controlling fan speeds in cooling the system. The coupling between the distribution unit and the battery fuse unit may be achieved with the aid of power supply bars between said battery fuse unit and said distribution unit.

Figure 3:
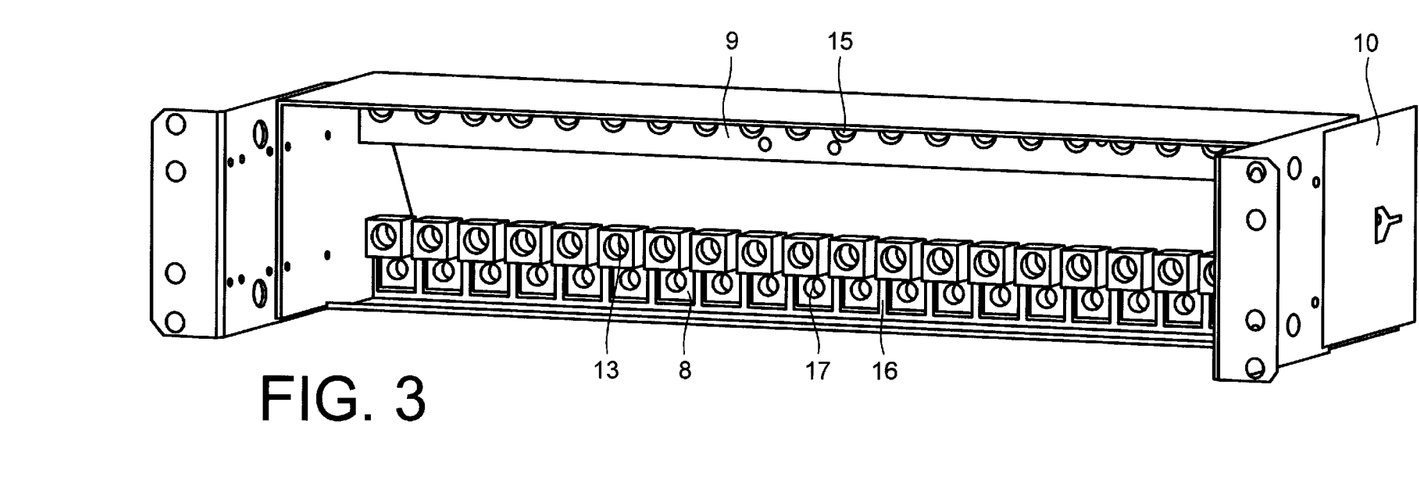
FIG. 3 is an oblique front view of circuit breaker connections constructed in accordance with the invention in a distribution unit for power supply equipment, but does not show the circuit breakers.

FIG. 3 illustrates the bottom mutually parallel circuit breaker connectors 8 and the upper power supply bar 9 disposed in a distribution unit according to FIG. 2 of power supply equipment. The bottom circuit breaker connectors 8 are mutually separated by an insulating and positioning element 16, where each connector includes an upper hole 13 for connection of the circuit breaker to the output side, and a lower hole 17 for connecting an output cable to the connector with the aid of a screw joint or some like means. The upper power supply bar 9 includes holes 15 for connection of the circuit breaker connectors to the input side. The distribution unit is designed for insertion in the upper part of the power supply equipment 11.

Figure 4:
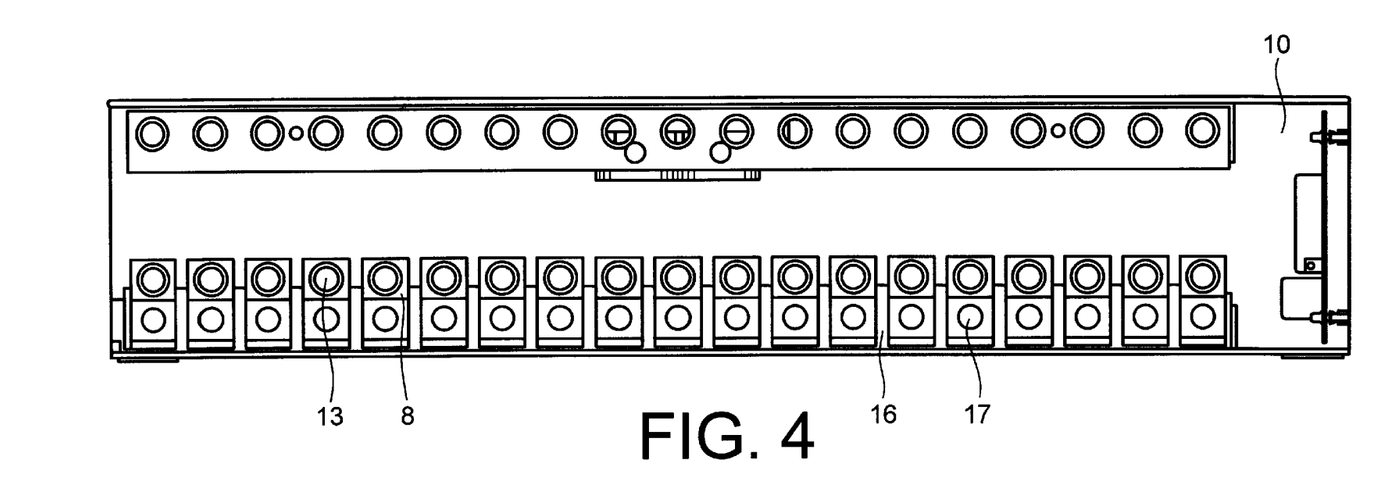
FIG. 4 is a straight-on front view of the distribution unit with all circuit breakers connected to their respective circuit breaker connections constructed in accordance with the invention.

FIG. 4 is a straight-on front view which shows the circuit breaker connectors 8 in the bottom row of connectors mutually separated by said insulating and positioning element 16, and shows the upper power supply bar 9 provided with holes 15 for connection of the circuit breakers. The bottom holes 17 are intended for connection of the output cable connections with the aid of a screw joint or some like means.

Figure 5:
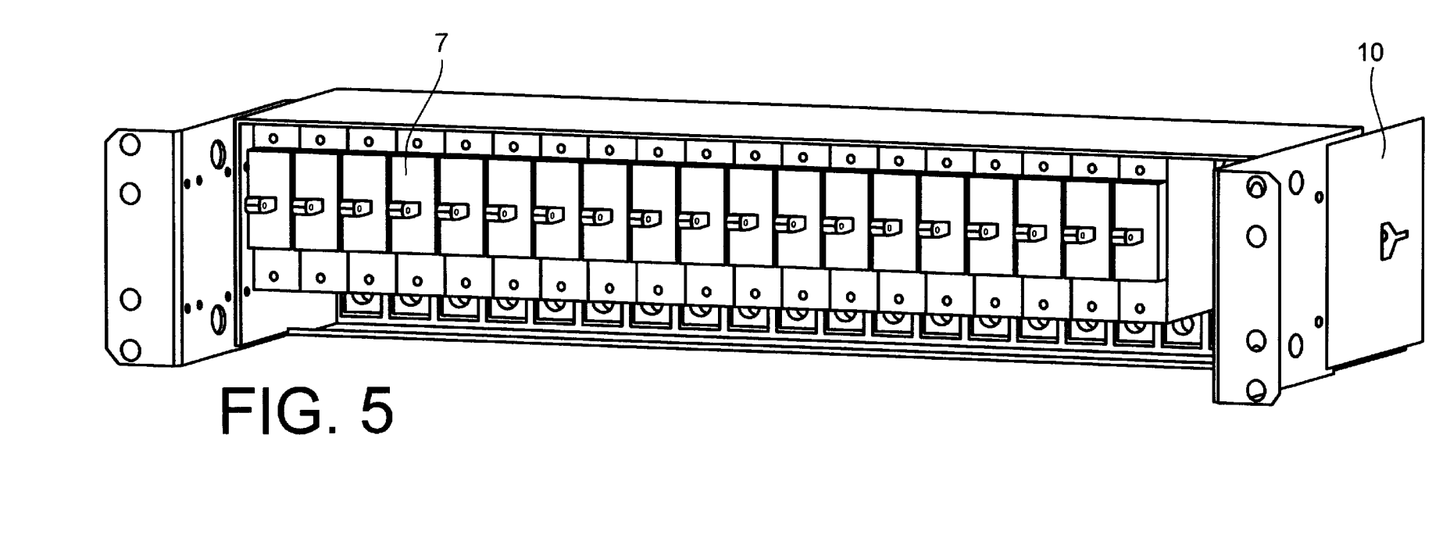
FIG. 5 is an oblique front view of the distribution unit with all circuit breakers connected to circuit breaker connectors in accordance with the invention.

In the FIG. 5 illustration nineteen mutually parallel circuit breakers 7 are inserted in and connected to the holes in the bottom circuit breaker connectors and the upper power supply bar. Depending on the level of current strength, up to 800 A, in respect of the distribution unit, each alternate circuit breakers can be used at higher current strengths per circuit breaker, such as ten (10) circuit breakers in the distribution unit 10 which can then be fitted as such in the upper part of the power supply equipment 11.

Figure 6:
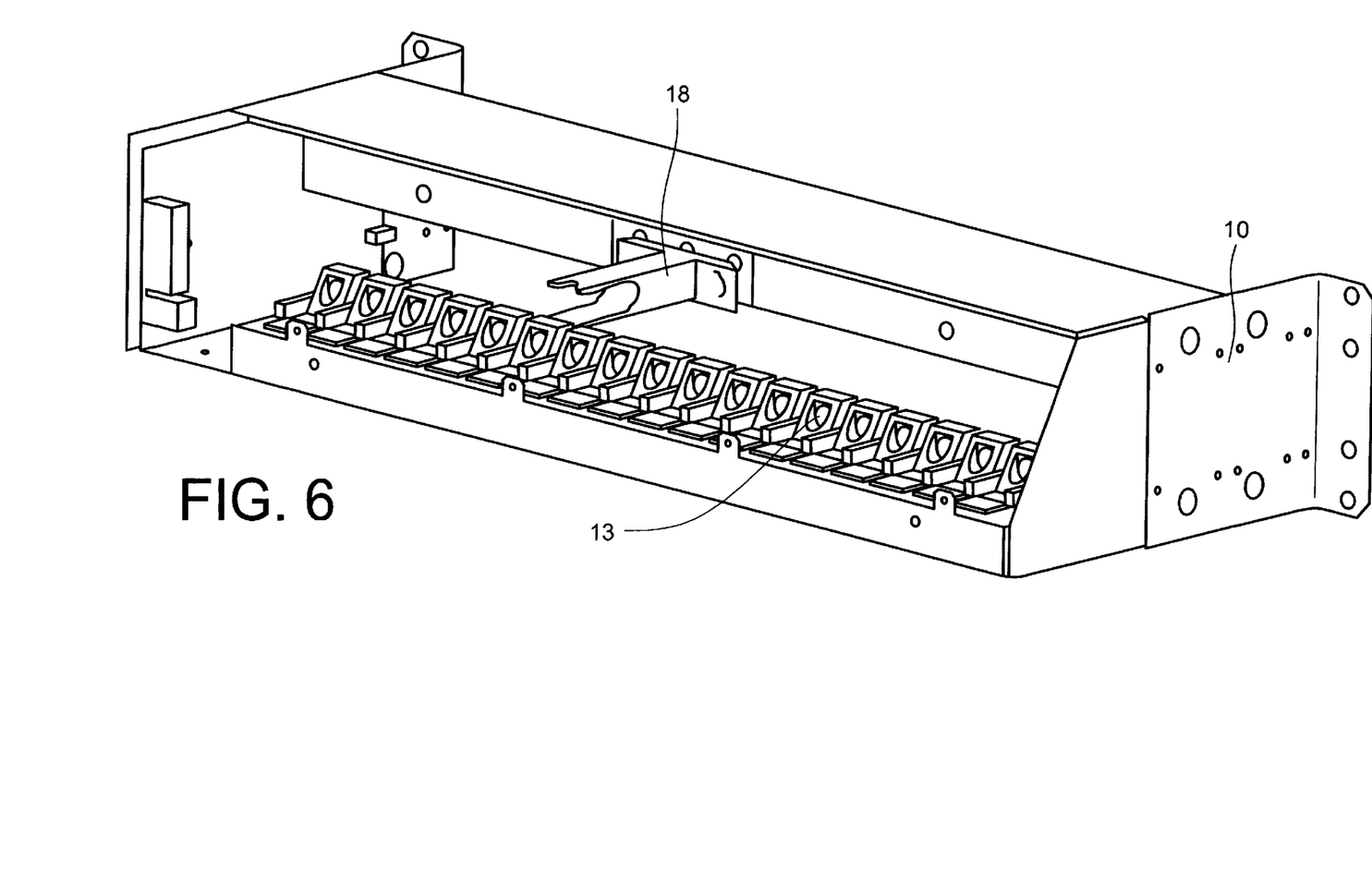
FIG. 6 is an oblique rear view of the distribution unit and shows the inventive circuit breaker connections, but not the circuit breakers themselves.

FIG. 6 is an oblique rear view of the distribution unit 10, showing holes 13 for receiving the circuit breaker connectors, and a centrally positioned fork-shaped electric contact 18 connected to the aforesaid power supply bar 9, wherewith the fork-shaped electrical contact can be connected directly to the supply from a connection unit on the rear side of the stand. The distribution unit housing the circuit breakers may contain connection points for nineteen circuit breakers and an alarm collection card which collects alarm signals from the circuit breakers. The circuit breakers will preferably sit on the positive side. The negative connection of the circuit breakers and shunts may be placed in the underlying unit. Any alarm signal sent from the distribution unit can be forwarded to a monitoring unit, wherewith a light-emitting diode that emits a red light is illuminated on the monitoring unit in respect of the circuit breaker concerned when a circuit breaker trips or in the event of some other alarm situation.

Figures 7, 8:
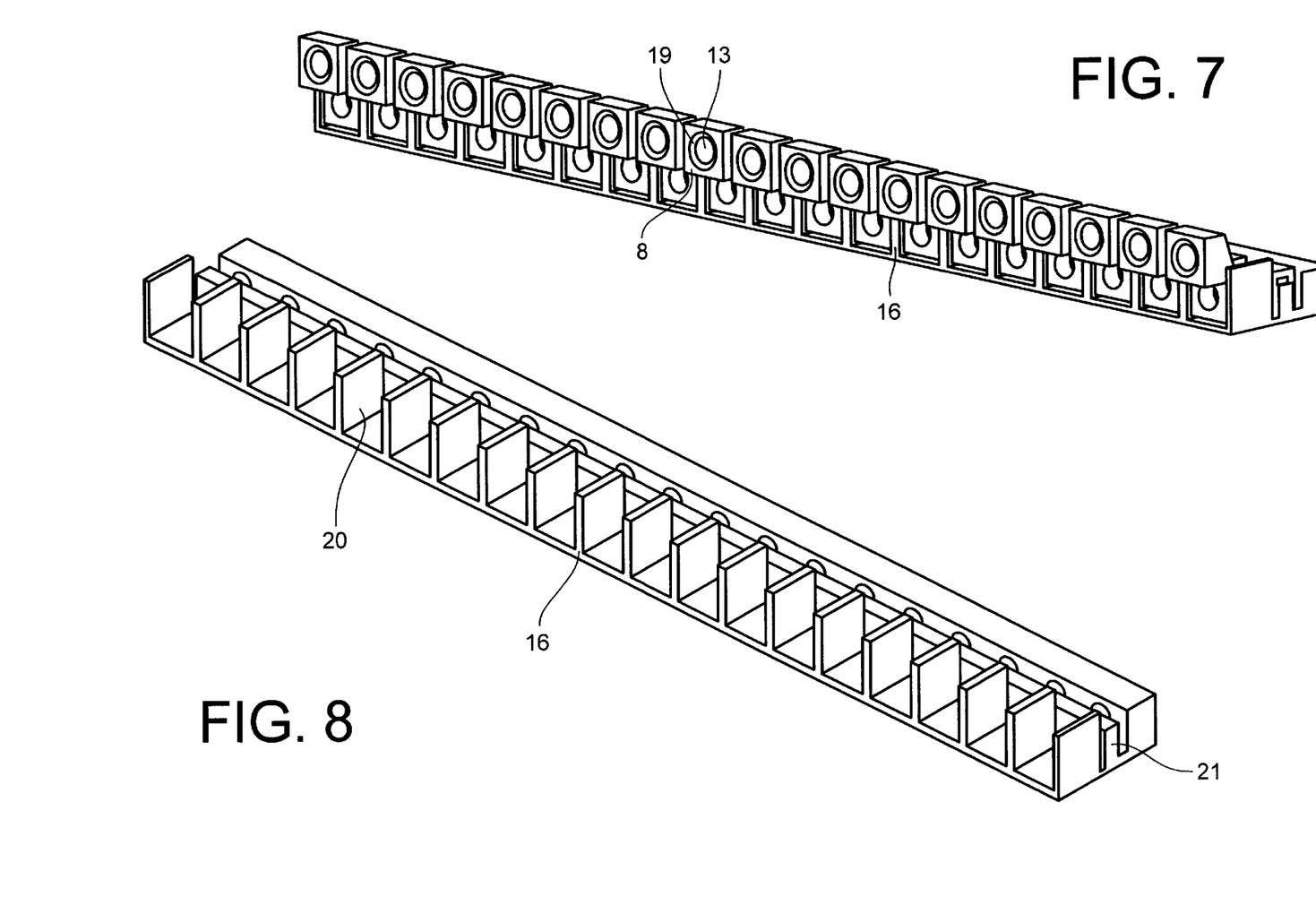
FIG. 7 is an oblique front view which shows several bottom circuit breaker connectors constructed in accordance with the invention and placed in a common insulating holder.
FIG. 8 is an oblique front view of the common insulating holder in FIG. 7 for bottom circuit breaker connections.

FIG. 7 shows a row of bottom circuit breaker connectors 8 that are mutually separated by respective insulating and positioning elements 16. It will be seen from the Figure that the holes 13 may be given a bevelled outer edge to facilitate insertion of the bottom resilient pin of the circuit breaker.

FIG. 8 shows that the insulating and positioning element 16 includes separate spaces 20 for positioning the individual connectors 8, and also shows the configuration of a position fixing and insulating bar 21 which coacts with a screw joint to secure the individual connections. In addition to fixing and securing the bottom connections in the positioning element, the screw joint also functions to connect a cable that carries a cable shoe for indicating the state of the circuit breaker, for instance.

Figure 9A:
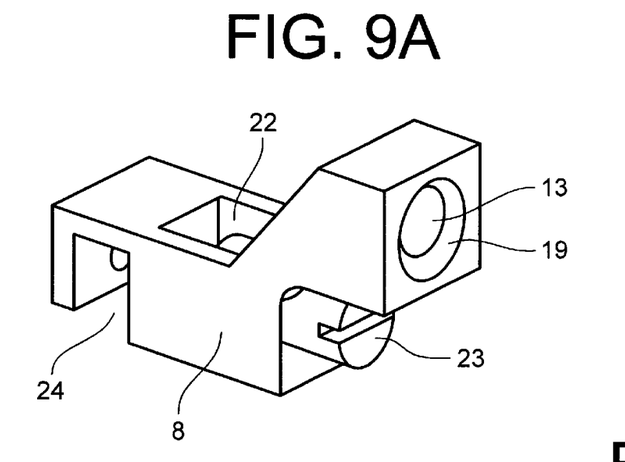
FIGS. 9A thru 9C are different views showing the design of a bottom circuit breaker connection in accordance with the invention.
Figure 9B:
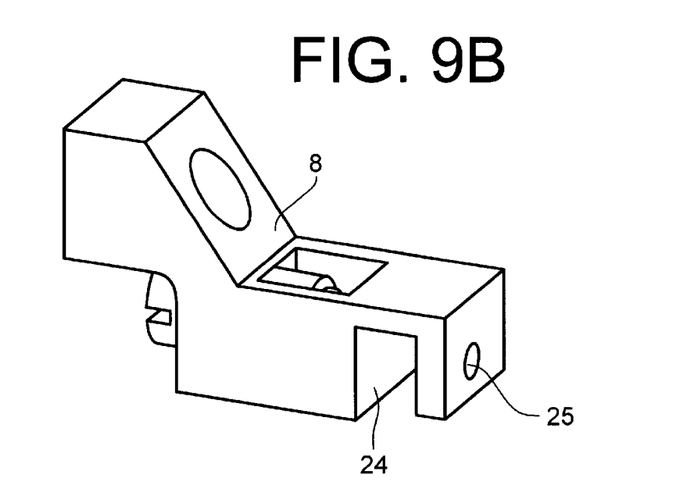
Figure 9C:
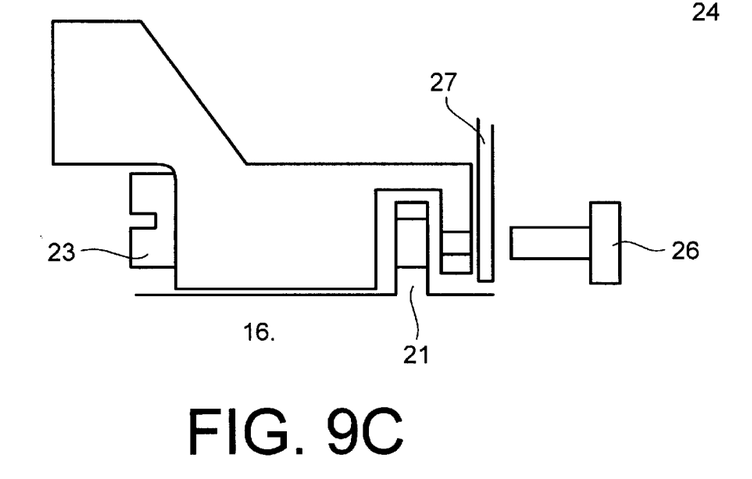

FIGS. 9A–9C illustrate the bottom circuit breaker connector, where FIG. 9A is an oblique front view of a circuit breaker connector 8 constructed in accordance with the invention and having a bevelled connection hole 19, a cable connecting space 22, a locking screw 23 for securing the end of an output cable, and a groove or slot 24 for receiving the insulating bar 21 of the positioning element 16, wherewith the hole 13 receiving the pole pin 12 extends generally at right angles to the hole 22 that receives said cable end. FIG. 9B is an oblique rear view of the circuit breaker connector 8, which shows the placement of the groove 24 and an adjacent hole 25 for receiving a screw 26 by means of which the circuit breaker connector is fixed and secured in relation to the insulating material/plastic bar 21 and for fixing an alarm-cable connected cable gripper 27 for delivering an alarm signal to an alarm board. FIG. 9C is a side view of the circuit breaker connector, which clearly shows the position of the screw 26 for fixing and retaining the connector in relation to a hole in the insulating bar 21 and the cable gripper or cable shoe 27. The bottom circuit breaker connector is preferably a one-piece structure and may be made of a metallic material, such as brass, that has been electrically tinned to provide an effective conductor. The connector may comprise an extruded profile that has been worked to the desired final configuration. The circuit breaker connectors or resilient pins are fitted into the holes 13 with a tolerance adapted to said pins. Output distribution cabling of up to 50 $mm^2$ can be connected in the cable connecting space 22, which may have the form of a flat surface for receiving one end of a screw, meaning that even the thinnest cable can be fixed and secured.

Figure 10:
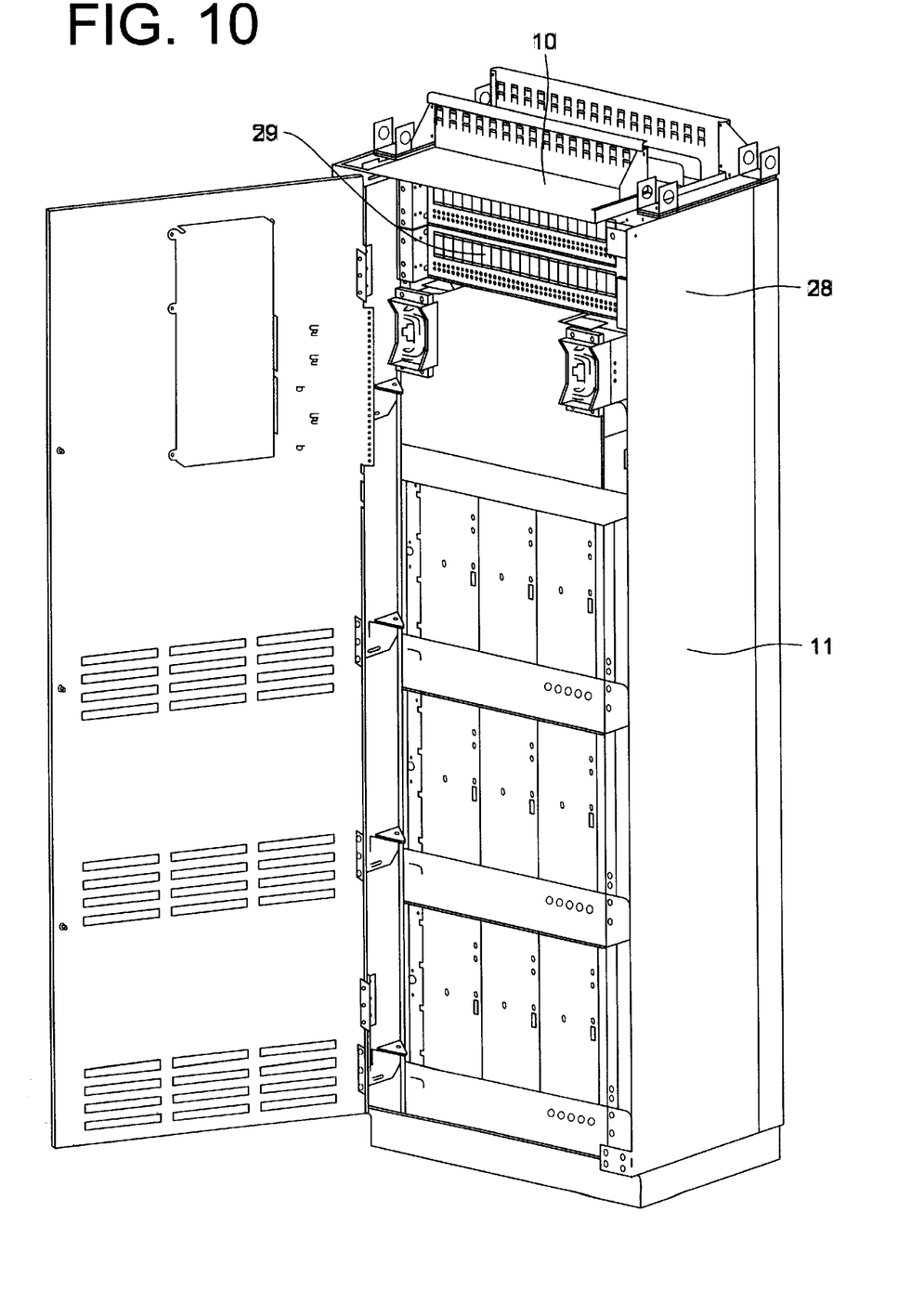
FIG. 10 illustrates power supply equipment having a distribution unit that includes circuit breakers connected to circuit breaker connectors.

FIG. 10 shows an example of a power supply equipment in the form of an equipped cabinet for use in a system for powering radio base stations and for charging their batteries. The power supply equipment housed in the cabinet may include distribution battery fuse units, rectifiers and converters. The distribution unit/distribution fuse unit 10 is mounted in the upper part 28 of a standard cabinet with several circuit breakers, optionally protected behind cover plate sections 29. The cabinet or stand may be adapted for parallel side-by-side or back-to-back coupling with other stands or cabinets. When stands or cabinets are connected in parallel, however, the equipment must be supplemented with special coupling elements, such as copper bars and sideplates.

It will be understood that the invention is not restricted to the aforedescribed and illustrated embodiments thereof and that modifications can be made within the scope of the following claims.

What is claimed is:

1. An apparatus for connecting one or more fuses, such as standard circuit breakers, directly to one or more bottom connectors and to an upper power supply bar of the apparatus, in power supply equipment for supplying power to radio base stations and for charging the batteries of such stations, the apparatus comprising:

a first hole adapted to fit a bottom pole pin on a respective circuit breaker inserted in the first hole;

a second hole adapted to fit a cable end of an inserted cable on the output side of the apparatus; and means for securing the circuit breaker connection with a positioning element; wherein the upper power supply bar is further provided with a third hole for receiving an upper pole pin of the respective circuit breaker on the input side of the apparatus.

2. An apparatus according to claim 1, wherein the first hole extends in a different direction from the second hole.

3. An apparatus according to claim 1, wherein the direction of the first hole is essentially perpendicular to the direction of the second hole.

4. An apparatus according to claim 1, wherein each of the one or more bottom connectors includes means for securing the cable end inserted into the second hole.

5. An apparatus according to claim 1, wherein the means for securing is further adapted with a cable grip or cable shoe to connect a signal cable for the purpose of registering the setting of the circuit breaker and/or registering the prevailing current strength.

6. An apparatus according to claim 1, wherein each of the one or more bottom connectors is disposed in parallel when the one or more fuses are connected in parallel.

7. An apparatus according to claim 1, wherein each of the one or more bottom connectors is a one-piece structure.

8. An apparatus according to claim 1, wherein each of the one or more bottom connectors is made of a metallic material, wherein the metallic material includes brass and wherein the each is further coated to provide effective electrical conductivity.

\* \* \* \* \*